United States Patent
Liang et al.

(10) Patent No.: US 9,933,986 B2
(45) Date of Patent: Apr. 3, 2018

(54) METHOD FOR SWITCHING DISPLAY MODE AND ELECTRONIC DEVICE THEREOF

(71) Applicant: Lenovo (Beijing) Co., Ltd., Beijing (CN)

(72) Inventors: Qiliang Liang, Beijing (CN); Xingming Yu, Beijing (CN); Jing Zhang, Beijing (CN); Chenye Zhou, Beijing (CN); Yunkai Chen, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 258 days.

(21) Appl. No.: 14/458,666

(22) Filed: Aug. 13, 2014

(65) Prior Publication Data

US 2015/0153991 A1 Jun. 4, 2015

(30) Foreign Application Priority Data

Nov. 29, 2013 (CN) .......................... 2013 1 0632703
Nov. 29, 2013 (CN) .......................... 2013 1 0634348

(51) Int. Cl.
G09G 5/00 (2006.01)
G06F 3/14 (2006.01)
G06F 3/01 (2006.01)

(52) U.S. Cl.
CPC ............ *G06F 3/1431* (2013.01); *G06F 3/017* (2013.01); *G06F 3/1446* (2013.01); *G09G 2354/00* (2013.01); *G09G 2360/04* (2013.01)

(58) Field of Classification Search
CPC ...... G06F 3/1431; G06F 3/017; G06F 3/1446; G09G 2354/00; G09G 2360/04
See application file for complete search history.

(56) References Cited

U.S. PATENT DOCUMENTS 8,564,549 B2  10/2013  Kim
9,124,713 B2   9/2015  Park et al.
9,665,330 B2   5/2017  Zhang
(Continued)

FOREIGN PATENT DOCUMENTS

CN    101461147 A    6/2009
CN    101710917 A    5/2010
(Continued)

OTHER PUBLICATIONS

"Guided Help: Dual monitor setup is easy in Windows 7!" Last Revision: Sep. 30, 2013, Accessed Apr. 7, 2017, https://support.microsoft.com/en-us/help/976064/guided-help-dual-monitor-setup-is-easy-in-windows-7.*

(Continued)

*Primary Examiner* — Peter D McLoone
(74) *Attorney, Agent, or Firm* — Harness, Dickey & Pierce, P.L.C.

(57) ABSTRACT

The disclosure provides a method for switching display mode and an electronic device. The method includes: detecting whether a first instruction for switching a display mode of the electronic device from the first display mode to the second display mode is received, in the case that the electronic device is in the first display mode; stopping synthesizing current data to be displayed in the first display mode and determining a second display unit corresponding to the second display mode, if the first detection result shows that the first instruction is received; determining a display channel corresponding to the second display unit, based on the corresponding relation between the display channel and the display unit; and synthesizing current data to be displayed in the second display mode, and transmitting the current data to be displayed in the second display mode to the second display unit to display it.

18 Claims, 14 Drawing Sheets

(56) References Cited

U.S. PATENT DOCUMENTS

| | | | |
|---|---|---|---|
| 2002/0075198 A1* | 6/2002 | Asahi | G06F 3/1423 345/1.1 |
| 2010/0011285 A1* | 1/2010 | Kawata | G06F 3/0481 715/246 |
| 2010/0048194 A1 | 2/2010 | Park et al. | |
| 2010/0105428 A1 | 4/2010 | Kim | |
| 2011/0154249 A1* | 6/2011 | Jang | G06F 3/017 715/781 |
| 2011/0193806 A1 | 8/2011 | Kim et al. | |
| 2012/0040716 A1* | 2/2012 | Kuncl | G03B 21/14 455/556.1 |
| 2013/0113681 A1 | 5/2013 | Zhang | |
| 2015/0319282 A1 | 11/2015 | Park et al. | |

FOREIGN PATENT DOCUMENTS

| | | |
|---|---|---|
| CN | 101729629 A | 6/2010 |
| CN | 101957717 A | 1/2011 |
| CN | 102111485 A | 6/2011 |
| CN | 102339194 A | 2/2012 |
| CN | 202373268 U | 8/2012 |
| CN | 102754066 A | 10/2012 |
| CN | 103226454 A | 7/2013 |
| JP | 2000236375 A | 8/2000 |
| WO | WO-2007120125 A1 | 10/2007 |

OTHER PUBLICATIONS

First Chinese Office Action regarding Application No. 201310632703.1 dated May 4, 2017. English translation provided by Unitalen Attorneys at Law.

First Chinese Office Action regarding Application No. 201310634348.1 dated May 26, 2017. English translation provided by Unitalen Attorneys at Law.

* cited by examiner

METHOD FOR SWITCHING DISPLAY MODE AND ELECTRONIC DEVICE THEREOF

The present application claims the priority of Chinese Patent Application No. 201310632703.1, entitled as "Method for switching display mode and electronic device thereof", and filed with the Chinese Patent Office on Nov. 29, 2013, and Chinese Patent Application No. 201310634348.1, entitled as "Method and device for controlling a mobile terminal, and the mobile terminal", and filed with the Chinese Patent Office on Nov. 29, 2013, the contents of which are incorporated herein by reference in its entirety.

FIELD

The disclosure relates to the field of display technology, and particularly to a method for switching display mode and an electronic device thereof.

BACKGROUND

With the development of display technology, display output ways supported on electronic devices such as smart phones are increasing. Currently, the display output ways of the smart phone includes HDMI, Wi-Fi display, micro-projectors and multiple screens, in addition to traditional LCD displays.

In the prior art, a display mode of a multi-screen system includes a single-display mode, a mirror mode and a mosaic mode. In fact, traditional switching between display modes of multi-screen system is a switching between display states under the same display mode. Specifically, the single-display mode refers to switching a display frame from one display screen to another display screen, the mirror mode refers to duplicating a display frame from one display screen to another display screen, and the mosaic mode refers to a mosaic display with multiple LCDs.

In the process of implementing the disclosure, the inventors find that the traditional switching between display modes of the multi-screen system are relatively simple and has not taken the full value of the multi-screen system, then it can not provide users with a new, lively and flexible application experience.

In addition, in the conventional art, a double-screen display function is provided for the mobile terminal to meet the requirements of the users. The mobile terminal supporting double-screen display is often provided with a first display unit and a second display unit, in which the first display unit is generally used as the main screen of the mobile terminal. In a case that there is a need for the second display unit to display, the user performs an operation on the mobile terminal to start the second display unit, thereby achieving second screen displaying. However, in researching for the disclosure, the inventor finds that there is a complex operation process for the mobile terminal to perform the second screen displaying in the conventional art, due to a series of control operations which are required to be performed on the mobile terminal to make it perform the second screen displaying.

SUMMARY

In view of this, the disclosure provides a method for switching display mode and an electronic device thereof to solve a problem that the traditional switching between display modes of the multi-screen system is relatively simple and has not taken full value of the multi-screen system, which can not provide users with a new, lively and flexible application experience. Technical solutions of the disclosure are described as follows.

A method for switching display mode, which is applied to an electronic device having a plurality of display units and the electronic device includes at least a first display mode and a second display mode, wherein each display unit corresponds to one display channel, each display channel corresponds to at least one display unit, the electronic device has pre-stored a corresponding relation between the display channel and the display unit, and the method includes:

detecting whether a first instruction is received and obtaining a first detection result, in the case that the electronic device is in the first display mode, wherein the first instruction is for switching a display mode of the electronic device from the first display mode to the second display mode;

stopping synthesizing current data to be displayed in the first display mode and determining a second display unit corresponding to the second display mode, if the first detection result shows that the first instruction is received, wherein the second display unit is one or more of the plurality of display units;

determining a display channel corresponding to the second display unit, based on the corresponding relation between the display channel and the display unit; and synthesizing current data to be displayed corresponding to a target display unit, and transmitting the current data to be displayed corresponding to the target display unit to the target display unit via the display channel corresponding to the second display unit, to display it.

Specifically, the electronic device has pre-stored a corresponding relation between the display modes and the display units; and the process of determining the second display unit corresponding to the second display mode includes:

determining a display unit corresponding to the second display mode as the second display unit, based on the corresponding relation between the display modes and the display units.

Optionally, the method further including:

storing current state information of the first display mode in the case that the display mode of the electronic device is switched from the first display mode to the second display mode, to restore display state of the display unit corresponding to the first display mode in the case that the display mode of the electronic device is switched back to the first display mode.

Optionally, the method further including:

determining whether a display unit different from the second display unit is present in display units corresponding to the first display mode; and allowing the display unit different from the second display unit in the display units corresponding to the first display mode to be turned off or to sleep, if the display unit different from the second display unit is present in the display units corresponding to the first display mode.

Optionally, the second display mode includes at least a first display state and a second display state; and the method further includes:

detecting whether a second instruction is received and obtaining a second detection result, in the case that the electronic device is in the first display state in the second display mode, wherein the second instruction is for switching a display state under the second display mode from the first display state to the second display state;

determining a second display unit corresponding to the second display state as a target display unit, if the second detection result shows that the second instruction is received;

determining a display channel corresponding to the target display unit, based on the corresponding relation between the display channel and the display unit; and synthesizing current data to be displayed in the second display state under the second display mode, and transmitting the current data to be displayed in the second display state under the second display mode to the target display unit via the display channel corresponding to the target display unit, to display it.

There is provided an electronic device having a plurality of display units and including at least a first display mode and a second display mode, wherein each display unit corresponds to one display channel, each display channel corresponds to at least one display unit, the electronic device has pre-stored a corresponding relation between the display channel and the display unit, and the electronic device includes:

a first detection unit, configured to detect whether a first instruction is received and obtain a first detection result in the case that the electronic device is in the first display mode, wherein the first instruction is for switching a display mode of the electronic device from the first display mode to the second display mode;

a first determination unit, configured to stop synthesizing current data to be displayed in the first display mode and determine a second display unit corresponding to the second display mode if the first detection result obtained by the first detection unit shows that the first instruction is received, wherein the second display unit is one or more of the plurality of display units;

a second determination unit, configured to determine a display channel corresponding to the second display unit which is determined by the first determination unit, based on the corresponding relation between the display channel and the display unit;

a first data synthesis unit, configured to synthesize current data to be displayed in the second display mode; and a first data transmission unit, configured to transmit the current data to be displayed in the second display mode, which is synthesized by the first data synthesis unit, to the second display unit corresponding to the second display mode via the display channel determined by the second determination unit, to display it.

Specifically, the electronic device has pre-stored a corresponding relation between the display modes and the display units; and the second determination unit is configured to determine a display unit corresponding to the second display mode as the second display unit, based on the corresponding relation between the display mode and the display unit.

Optionally, the electronic device further including:

a storage unit, configured to store current state information of the first display mode in the case that the display mode of the electronic device is switched from the first display mode to the second display mode, to restore display state of the display unit corresponding to the first display mode in the case that the display mode of the electronic device is switched back to the first display mode.

Optionally, the electronic device further including:

a third determination unit, configured to determine whether a display unit different from the second display unit is present in display units corresponding to the first display mode; and a state control unit, configured to allow the display unit different from the second display unit in the display units corresponding to the first display mode to be turned off or to sleep, if the third determination unit determines that the display unit different from the second display unit is present in the display units corresponding to the first display mode.

Optionally, the second display mode includes a first display state and a second display state; and the electronic device further includes:

a second detection unit, configured to detect whether a second instruction is received and obtain a second detection result in the case that the electronic device is in the first display state in the second display mode, wherein the second instruction is for switching a display state in the second display mode from the first display state to the second display state;

a fourth determination unit, configured to determine a second display unit corresponding to the second display state as a target display unit if the second detection result obtained by the second detection unit shows that the second instruction is received;

a fifth determination unit, configured to determine a display channel corresponding to the target display unit which is determined by the fourth determination unit, based on the corresponding relation between the display channel and the display unit;

a second data synthesis unit, configured to synthesize current data to be displayed corresponding to the target display unit; and a second data transmission unit, configured to transmit the current data to be displayed corresponding to the target display unit, which is synthesized by the second data synthesis unit, to the target display unit via the display channel corresponding to the target display unit, to display it.

Technical solutions described above have the following beneficial effects:

In the prior art, the electronic device has one display channel, through which a plurality of display units display data, which causes the plurality of display units to display the same data, or causes the same data to be displayed on different display units, and thus switching between different display modes can not be achieved. Compared with the prior art, the electronic device according to the disclosure has a variety of display modes, where each display mode corresponds to at least one display unit, and each display unit corresponds to one display channel. Based on this, with the method for switching display mode according to the disclosure, a second display unit corresponding to the second display mode may be determined in the case that switching instruction for switching the first display mode to the second display mode is received, and then a display channel corresponding to the second display unit may be determined, and the current data to be displayed in the second display mode is transmitted to the second display unit via the determined display channel to display. The method for switching display mode and the electronic device according to the disclosure can achieve switching between different display modes and take full value of a plurality of display units, providing users with an innovative, lively and flexible application experience.

The above method for switching display mode can be used as a method for controlling a mobile terminal, which is applied to a mobile terminal, where the mobile terminal includes a first display unit, a second display unit and a sensor, and the method for controlling the mobile terminal includes:

acquiring first information of the mobile terminal by the sensor;

judging whether there is a need for the second display unit to perform a display operation based on the first information of the mobile terminal, and generating a first judgment result; and controlling the second display unit to display in a case that it is determined there is a need for the second display unit to perform the display operation based on the first judgment result.

Preferably, the method for controlling the mobile terminal further includes:

switching an application mode of the first display unit of the mobile terminal in the case that it is determined there is a need for the second display unit to perform the display operation based on the first judgment result, to make the first display unit of the mobile terminal enter a standby state.

Preferably, in a case that the sensor is a gravity sensor and the first information is attitude information of the mobile terminal that is acquired by the gravity sensor, the judging whether there is a need for the second display unit to perform a display operation includes:

judging whether a first plane of the mobile terminal is vertically downward based on the attitude information of the mobile terminal that is transmitted by the gravity sensor in a case that the first display unit is integrated in the first plane of the mobile terminal, and determining there is a need for the second display unit to perform a display operation if it is judged that the first plane is vertically downward, or determining there is no need for the second display unit to perform a display operation if it is judged that the first plane is not vertically downward.

Preferably, in a case that the sensor includes a gravity sensor and a proximity sensor, and the first information includes attitude information of the mobile terminal that is acquired by the gravity sensor and distance information of the mobile terminal that is transmitted by the proximity sensor, the judging whether there is a need for the second display unit to perform a display operation includes:

judging whether a first plane of the mobile terminal is vertically downward based on the attitude information of the mobile terminal that is transmitted by the gravity sensor in a case that the first display unit is integrated in the first plane; and judging whether the mobile terminal is placed on a plane based on the distance information of the mobile terminal that is transmitted by the proximity sensor in a case that it is determined the first plane is vertically downward based on the attitude information of the mobile terminal, and determining there is a need for the second display unit to perform a display operation if it is judged that the mobile terminal is placed on the plane, or determining there is no need for the second display unit to perform a display operation if it is judged that the mobile terminal is not placed on the plane.

Preferably, the method for controlling the mobile terminal further includes:

acquiring application information of the mobile terminal after the second display unit starts performing the display operation; and controlling the second display unit to display the application information.

Preferably, the controlling the second display unit to display in a case that it is determined there is a need for the second display unit to perform the display operation includes:

determining a display mode in a case that it is determined there is a need for the second display unit to perform the display operation; and controlling, based on the display mode, the second display unit to perform the display operation in the display mode.

Preferably, the method for controlling the mobile terminal further includes:

identifying a gesture operation for the second display unit by changes in light and shadow that occur when the second display unit displays, after the second display unit starts performing the display operation; and controlling the second display unit to perform an operation based on the identified gesture operation.

Accordingly, the electronic device is a mobile terminal, having a device for controlling the mobile terminal which is also disclosed by the disclosure, where the mobile terminal includes a first display unit, a second display unit and a sensor, and the device for controlling the mobile terminal includes:

an acquisition module configured to acquire first information of the mobile terminal by the sensor;

a judgment module configured to judge whether there is a need for the second display unit to perform a display operation based on the first information of the mobile terminal, and generate a first judgment result; and a display module configured to control the second display unit to display in a case that it is determined there is a need for the second display unit to perform the display operation based on the first judgment result.

Preferably, the device for controlling the mobile terminal further includes:

an application mode switching module configured to switch an application mode of the first display unit of the mobile terminal in the case that it is determined there is a need for the second display unit to perform the display operation based on the first judgment result, to make the first display unit of the mobile terminal enter a standby state.

Preferably, in a case that the sensor is a gravity sensor and the first information is attitude information of the mobile terminal that is acquired by the gravity sensor, the judgment module includes:

a first judgment unit configured to judge whether a first plane of the mobile terminal is vertically downward based on the attitude information of the mobile terminal that is transmitted by the gravity sensor in a case that the first display unit is integrated in the first plane, and determine there is a need for the second display unit to perform a display operation if it is judged that the first plane is vertically downward, or determine there is no need for the second display unit to perform a display operation if it is judged that the first plane is not vertically downward.

Preferably, in a case that the sensor includes a gravity sensor and a proximity sensor, and the first information includes attitude information of the mobile terminal that is acquired by the gravity sensor and distance information of the mobile terminal that is transmitted by the proximity sensor, the judgment module includes:

a second judgment unit configured to judge whether a first plane of the mobile terminal is vertically downward based on the attitude information of the mobile terminal that is transmitted by the gravity sensor in a case that the first display unit is integrated in the first plane; and a third judgment unit configured to: judge whether the mobile terminal is placed on a plane based on the distance information of the mobile terminal that is transmitted by the proximity sensor in a case that it is determined the first plane is vertically downward based on the attitude information of the mobile terminal; and determine there is a need for the second display unit to perform a display operation if it is judged that the mobile terminal is placed on the plane, or determine there is no need for the second display unit to perform a display operation if it is judged that the mobile terminal is not placed on the plane.

Preferably, the device for controlling the mobile terminal further includes:

an application information acquisition module configured to acquire application information of the mobile terminal after the second display unit starts performing the display operation; and an application information display module configured to control the second display unit to display the application information.

Preferably, the display module includes:

a display mode determination unit configured to determine a display mode in a case that it is determined there is a need for the second display unit to perform the display operation; and a display unit configured to control, based on the display mode, the second display unit to perform the display operation in the display mode.

Preferably, the device for controlling the mobile terminal further includes:

a gesture identification module configured to identify a gesture operation for the second display unit by changes in light and shadow that occur when the second display unit displays, after the second display unit starts performing the display operation; and a control module configured to control the second display unit to perform an operation based on the identified gesture operation.

Accordingly, a mobile terminal is also disclosed by the disclosure, where the mobile terminal includes a first display unit, a second display unit and a sensor, and the device for controlling the mobile terminal described above is integrated in a processor of the mobile terminal.

With the method for controlling the mobile terminal, the first information of the mobile terminal is acquired by the sensor, and in the case that it is determined there is a need for the second display unit to perform the display operation based on the first information, the mobile terminal controls the second display unit to display. Therefore, there is no need for the user to perform a control operation on the mobile terminal, simplifying the operation process of the second screen displaying.

BRIEF DESCRIPTION OF THE DRAWINGS

In order to more clearly illustrate the technical solution in the embodiments of the disclosure or in the prior art, drawings to be used in the descriptions of the embodiments or the prior art will be introduced briefly hereinafter. Apparently, the drawings in the descriptions below are merely some embodiments of the disclosure. Those skilled in the art can also obtain other drawings from the provided drawings without any creative efforts.

DETAILED DESCRIPTION

The technical solution in the embodiments of the disclosure will be described clearly and completely hereinafter in conjunction with the drawings in the embodiments of the disclosure. Apparently, the embodiments described are only some embodiments of the disclosure, rather than all embodiments. All other embodiments that can be obtained by those skilled in the art without any creative efforts should fall into the scope of protection of the disclosure.

Figure 1:
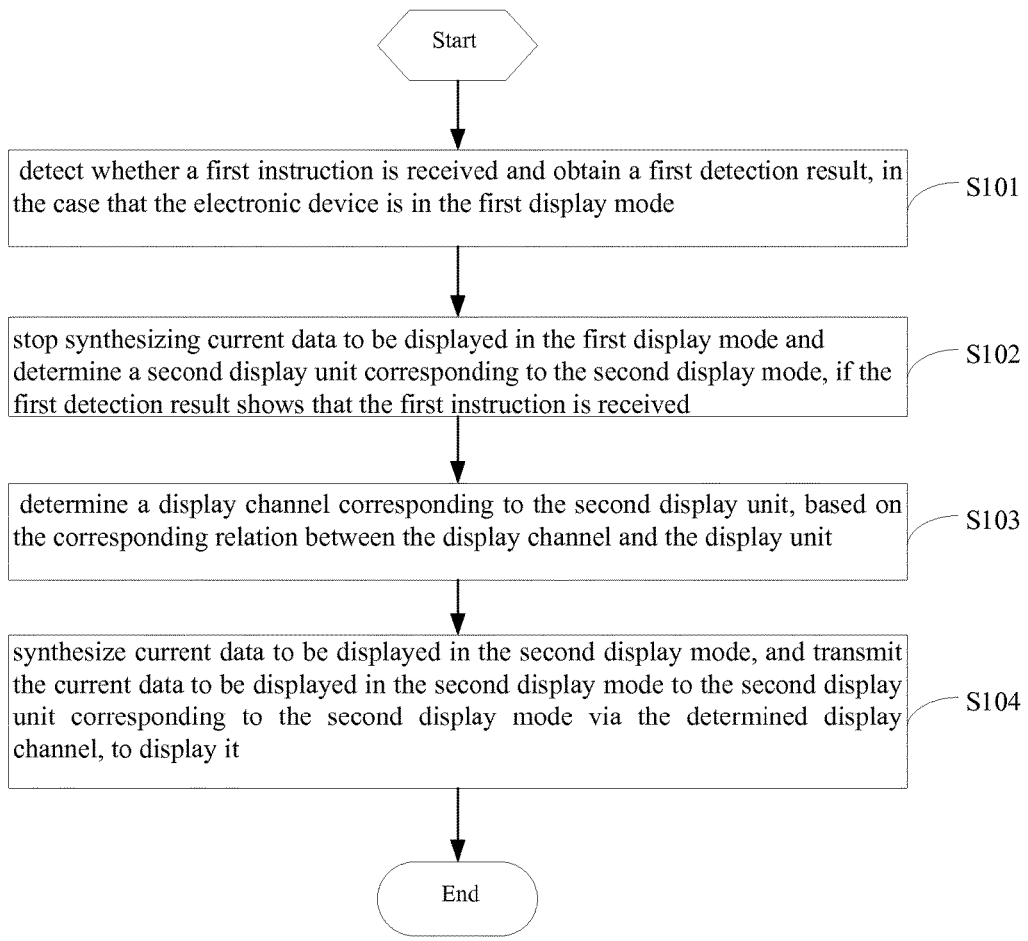
FIG. 1 is a schematic flow diagram of a method for switching display mode according to an embodiment of the disclosure.

Reference is made to FIG. 1 which is a schematic flow diagram of a method for switching display mode according to an embodiment of the disclosure. The method is applied to an electronic device having a plurality of display units, and the electronic device includes at least a first display mode and a second display mode, where each display unit corresponds to one display channel, each display channel corresponds to at least one display unit, the electronic device has pre-stored a corresponding relation between the display channel and the display unit. The method may include steps S101 to S104 as follow.

In step S101, it is detected whether a first instruction is received and a first detection result is obtained, in the case that the electronic device is in the first display mode.

Specifically, the first instruction is for switching a display mode of the electronic device from the first display mode to the second display mode.

In this embodiment, the display mode of the electronic device may include a single-display mode, a mirror mode, an independent mode and an extended mode.

Schematically, the electronic device has two display units, in which one display unit functions as a main screen of the electronic device and the other functions as a sub-screen of the electronic device. The so-called single-display mode refers to that one of the main screen and the sub-screen is allowed to display content, the so-called mirror mode refers to that the main screen and the sub-screen display the same content, the so-called independent mode refers that the main screen and the sub-screen mode display contents of different applications, and the so-called extended mode refers that the main screen and the sub-screen display different contents of the same application.

Figure 2:
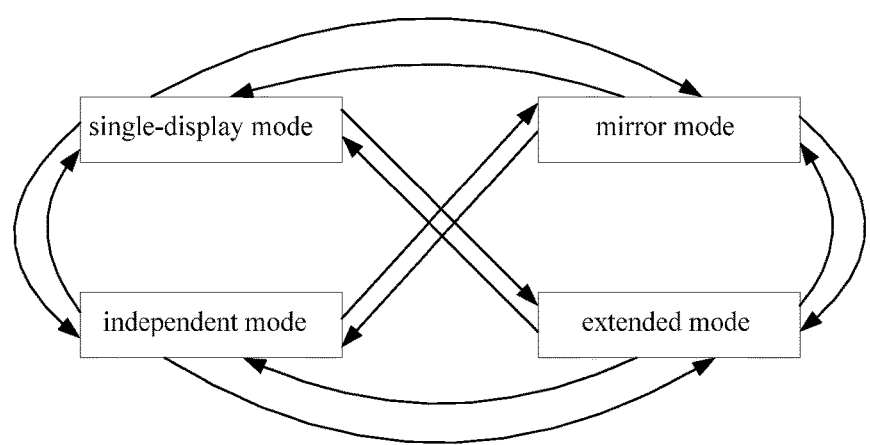
FIG. 2 is a schematic diagram of display mode switching according to an embodiment of the disclosure.

In this embodiment, the first display mode and the second display mode may be any two of the single-display mode, the mirror mode, the independent mode and the extended mode. Reference is made to FIG. 2 which is a schematic diagram of switching between display modes, in which any two display modes may be switched to each other. Schematically, the first display mode is the single-display mode and the second display mode is the mirror mode. When receiving the first instruction, the electronic device switches the single-display mode to the mirror mode.

Specifically, the electronic device may display an interactive interface, on which an operation option of display mode switching may be displayed. Schematically, the operation option of display mode switching may include "single-display mode→mirror Mode", "mirror mode→independent mode" "independent mode→extended mode", "extended mode→single-display mode", "single-display mode→independent mode". When a user selects an operation option "single-display mode→mirror mode" on the interactive interface, the electronic device receives the first instruction and executes an operation corresponding to the first instruction, i.e., switches the single-display mode to the mirror mode.

In step S102, synthesis of current data to be displayed in the first display mode is stopped and a second display unit corresponding to the second display mode is determined, if the first detection result shows that the first instruction is received.

Specifically, the second display unit is one or more of the plurality of display units.

Since the electronic device has a plurality of display units, and the display unit corresponding to the first display mode may be different from the display unit corresponding to the second display mode, it is needed to determine a second display unit corresponding to the second display mode in the process of the display mode is switched to the second display mode.

Specifically, the electronic device may preset a display unit corresponding to each display mode and store a corresponding relation between the display mode and the display unit, and then the process of determining the second display unit corresponding to the second display mode includes: in the process that the display mode is switched to the second display mode, a display unit corresponding to the second display mode is determined as the second display unit, based on the corresponding relation between the display mode and the display unit.

Schematically, the first display mode is the single-display mode, the second display mode is the mirror mode, the electronic device has four display units, namely a display unit 1, a display unit 2, a display unit 3 and a display unit 4, the display units corresponding to single-display mode is preset to be the display unit 1 and the display unit 2, and the display units corresponding to the mirror mode is preset to the display unit 4 and the display unit 3, when receiving the first instruction for switching the single-display mode to the mirror mode, the electronic device determines the display units corresponding to the mirror mode as the display unit 3 and the display unit 4.

In step S103, a display channel corresponding to the second display unit is determined, based on the pre-stored corresponding relation between the display channel and the display unit.

In the embodiments of the disclosure, each of the display units of the electronic device corresponds to one display channel.

Schematically, the electronic device has four display units, namely the display unit 1, the display unit 2, the display unit 3 and the display unit 4, and the electronic device accordingly provides with a display channel 1, a display channel 2, a display channel 3 and a display channel 4, and the display unit 1 corresponds to the display channel 1, the display unit 2 corresponds to the display channel 2, the display unit 3 corresponds to the display channel 3, and the display unit 4 corresponds to the display channel 4.

After it is determined that the display unit 3 and the display unit 4 corresponding to the second display mode, a display channel corresponding to the display unit 3 may be determined as the display channel 3 and a display channel corresponding to the display unit 4 may be determined as the display channel 4, based on the corresponding relation between the display unit and the display channel.

In step S104, current data to be displayed in the second display mode is synthesized, and the current data to be displayed in the second display mode is transmitted to the second display unit corresponding to the second display mode via the determined display channel, to display it.

Schematically, assuming that the second display unit corresponding to the second display mode includes the display unit 3 and the display unit 4, the data to be displayed is transmitted to the display unit 3 via the display channel 3 corresponding to the display unit 3, to display it. Similarly, the data to be displayed is transmitted to the display unit 4 via the display channel 4 corresponding to the display unit 4, to display it.

In the prior art, the electronic device has one display channel, through which a plurality of display units display data, which causes the plurality of display units to display the same data, or causes the same data to be displayed on different display units, and as a result, switching between different display modes can not be achieved. Compared with the prior art, the electronic device according to the embodiment of the disclosure has a variety of display modes, where each display mode corresponds to at least one display unit, and each display unit corresponds to one display channel. Based on this, with the method for switching display mode according to the disclosure, a second display unit corresponding to the second display mode may be determined in the case that switching instruction for switching the first display mode to the second display mode is received, and then a display channel corresponding to the second display unit may be determined, and the current data to be displayed in the second display mode is transmitted to the second display unit via the determined display channel to display. The method for switching display mode and the electronic device according to the embodiment of the disclosure can implement switching between different display modes and take full advantage of the value of a plurality of display units, providing users with an innovative, lively and flexible application experience.

Figure 3:
FIG. 3 is a schematic flow diagram of another method for switching display mode according to an embodiment of the disclosure.

It should be taken into account that the electronic device may be switched back to the first display mode, after the electronic device is switched from the first display mode to the second display mode. In order to ensure the display state of the first display mode to return to the previous state, state information of the first display mode is needed to be saved. Further, it should be taken into account that power consumption of the electronic device would increase if the display unit corresponding to the first display mode is still in on-state, in the process that the electronic device is switched from the first display mode to the second display mode. Based on the above considerations, an embodiment of the disclosure provides another method for switching display mode, and a schematic flow diagram of the method is shown in FIG. 3. The method may include steps S301 to S307 as follows.

In step S301, it is detected whether a first instruction is received and a first detection result is obtained, in the case that the electronic device is in the first display mode.

Specifically, the first instruction is for switching a display mode of the electronic device from the first display mode to the second display mode.

In step S302, a synthesis of current data to be displayed in the first display mode is stopped and current state information of the first display mode is saved, if the first detection result shows that the first instruction is received.

Specifically, the current state information may be information displayed currently by the display unit corresponding to the first display mode. In the case that the display mode of the electronic device is switched back to the first display mode, the display state of the display unit corresponding to the first display mode is restored based on the saved state information.

In step S303, a display unit corresponding to the second display mode is determined as the second display unit, based on the pre-stored corresponding relation between the display mode and the display unit.

In step S304, it is determined whether a display unit different from the second display unit is present in display units corresponding to the first display mode, and a determination result is obtained.

In step S305, the display unit different from the second display unit in the display units corresponding to the first display mode is allowed to be turned off or to sleep, if the determination result shows that the display unit different from the second display unit is present in the display units corresponding to the first display mode.

In order to reduce power consumption of the electronic device, the display unit not used is allowed to be turned off or to sleep. Schematically, the display units corresponding to the first display mode include a display unit 1, a display unit 2 and a display unit 3, and the display units corresponding to the second display mode include the display unit 3 and a display unit 4. Since the display unit 3 is a common display unit of the first display mode and the second display mode, the display unit 3 needs to be always in on-state. Since the display unit 1 and the display unit 2 are not in use in the second display mode, the display unit 1 and the display unit 2 are allowed to be turned off, or the display unit 1 and the display unit 2 are allowed to sleep to reduce power consumption of the electronic device.

In step S306, a display channel corresponding to the second display unit is determined, based on the pre-stored corresponding relation between the display channel and the display unit.

In step S307, current data to be displayed in the second display mode is synthesized, and the current data to be displayed in the second display mode is transmitted to the second display unit corresponding to the second display mode via the determined display channel, to display it.

It should be noted that in the present embodiment, except that step S302 and steps S304 to S305 are different from the above-described embodiments, the other steps are the same as the above-described embodiments, and the specific implementation may refer to the above-described embodiments, which is not repeated herein.

In the prior art, the electronic device has one display channel, through which a plurality of display units display data, which causes the plurality of display units to display the same data, or causes the same data to be displayed on different display units, and thus switching between different display modes can not be achieved. Compared with the prior art, the electronic device according to the embodiment of the disclosure has a variety of display modes, where each display mode corresponds to at least one display unit, and each display unit corresponds to one display channel. Based on this, with the method for switching display mode according to the disclosure, a second display unit corresponding to the second display mode may be determined in the case that switching instruction for switching the first display mode to the second display mode is received, and then a display channel corresponding to the second display unit may be determined, and the current data to be displayed in the second display mode is transmitted to the second display unit via the determined display channel to display it. The method for switching display mode and the electronic device according to the embodiment of the disclosure can implement switching between different display modes and take full advantage of the value of a plurality of display units, providing users with an innovative, lively and flexible application experience. Further, with the method for switching display mode according to the embodiment of the disclosure, the display state of the display unit corresponding to the first display mode may be restored in the case that the display mode is switched back to the first display mode, and a display unit unrelated to the second display mode is allowed to be turned off or to sleep, thereby power consumption of the electronic device is reduced.

Figure 4:
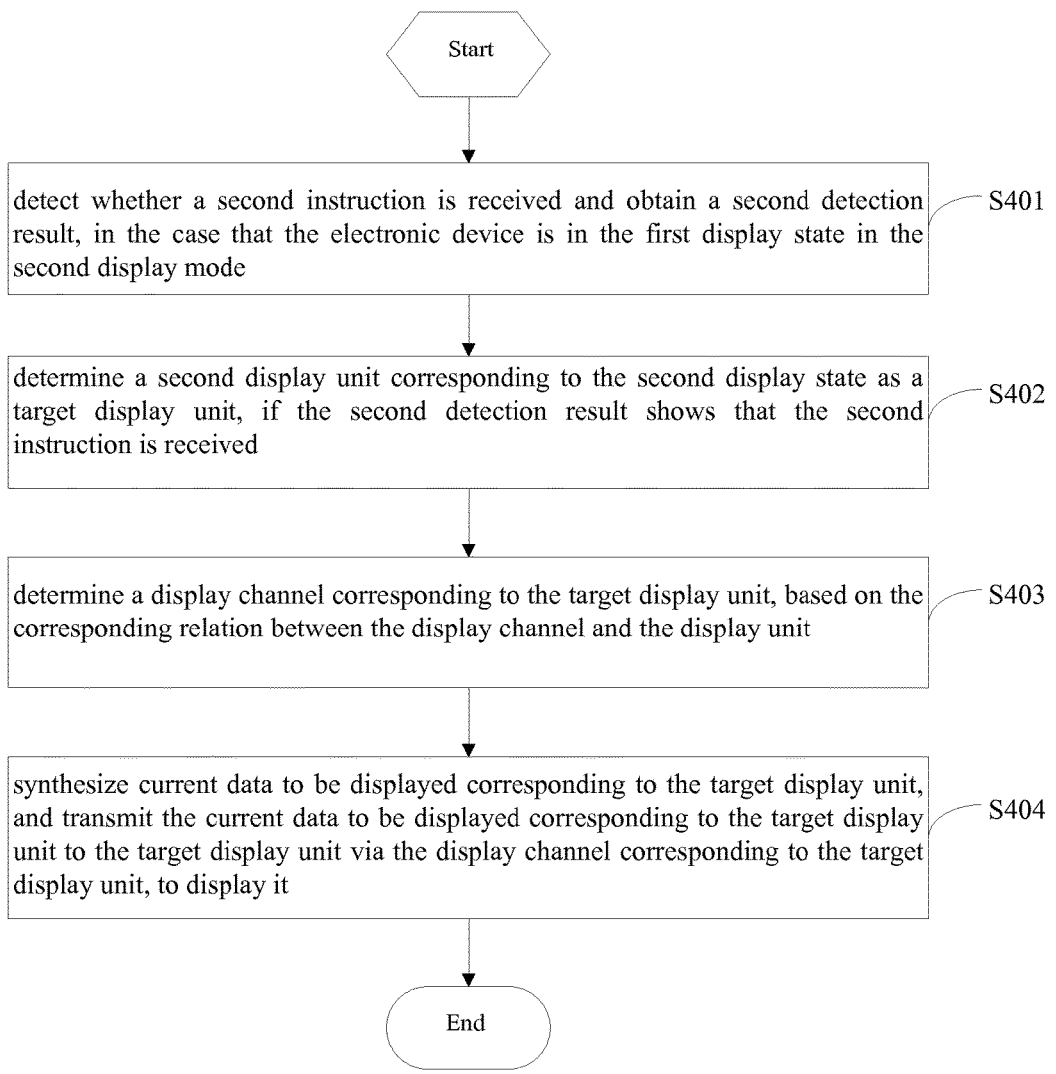
FIG. 4 is a schematic flow diagram of yet another method for switching display mode according to an embodiment of the disclosure.

The method for switching display mode according to the above-described embodiments achieves switching of the electronic device between different display modes. Generally, one display mode may correspond to a variety of display states. In order to achieve switching between different display states in the same display mode, an embodiment of the disclosure provides another method for switching display mode, and the method for switching display mode according to the present embodiment differs from the above-described embodiments in the fact that it further includes a display state switching process, in addition to steps of the method according to any one of the embodiments described above. Reference is made to FIG. 4 which is schematic flow diagram of display state switching according to an embodiment of the disclosure, in which the second mode includes at least a first display state and a second display state. The method for switching display state may include steps S401 to S404 as follows.

In step S401, it is detected whether a second instruction is received and a second detection result is obtained, in the case that the electronic device is in the first display state in the second display mode.

Specifically, the second instruction is for switching a display state in the second display mode from the first display state to the second display state.

In step S402, a second display unit corresponding to the second display state is determined as a target display unit, if the second detection result shows that the second instruction is received.

Specifically, the target display unit is at least one of the second display units corresponding to the second display mode.

In step S403, a display channel corresponding to the target display unit is determined, based on the corresponding relation between the display channel and the display unit;

In step S404, current data to be displayed corresponding to the target display unit is synthesized, and the current data to be displayed corresponding to the target display unit is transmitted to the target display unit via the display channel corresponding to the target display unit, to display it.

Figure 5:
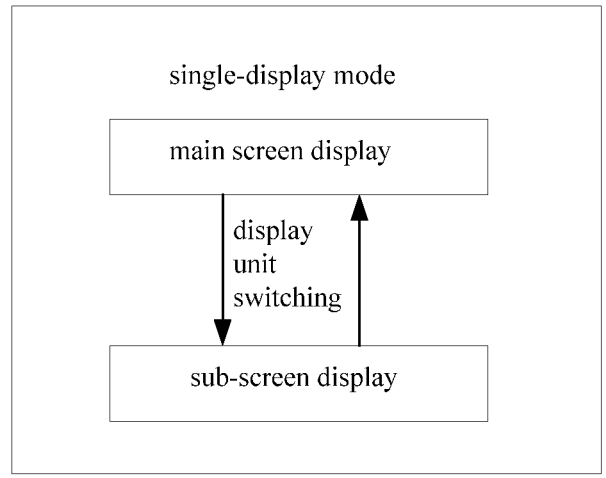
FIG. 5 is a schematic diagram of display state switching in a single-display mode according to an embodiment of the disclosure.

Schematically, the second display mode is the single-display mode, a state switching schematic diagram of the single-display mode is shown in FIG. 5, display units corresponding to the second display mode includes a display screen 1 (which may be used as a main screen) and a display screen 2 (which may be used as a sub-screen), and the first display state in the second display mode is a main screen display and the second display state is a sub-screen display. The electronic device may display an interactive interface on which an operation option of display state switching may be displayed. The operation option of state switching may include "main screen→sub-screen", "sub-screen→main screen". When a user selects an operation option "main screen→sub-screen" on the interactive interface, the electronic device receives the second instruction and executes an operation corresponding to the second instruction, i.e., switches the main screen display to the sub-screen display. Specifically, the main screen corresponds to the display channel 1 and the sub-screen corresponds to the display channel 2, if a display channel corresponding to the sub-screen is determined as the display channel 2 in the case that the main screen display is switched to the sub-screen display, then the current data to be displayed is transmitted to the sub-screen via the display channel 2 to display it, thereby switching between the display states is implemented.

Figure 6:
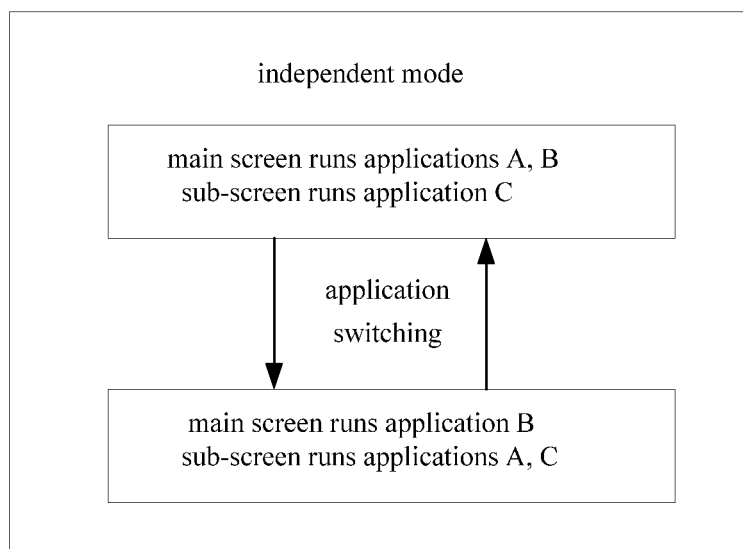
FIG. 6 is a schematic diagram of display state switching in an independent mode according to an embodiment of the disclosure.

Schematically, the second display mode is the independent mode, a state switching schematic diagram of the independent mode is shown in FIG. 6, a display unit corresponding to the second display mode includes a display screen 1 (which may be used as a main screen) and a display screen 2 (which may be used as a sub-screen), the first display state in the second display mode is that the main screen runs applications A, B and the sub-screen runs an application C, and the second display state is that the main screen runs the application B and the sub-screen runs the application A, C. When the second instruction for switching the first display state to the second display state is received, current data to be displayed of the application B is transmitted to the main screen via the display channel 1 corresponding to the main screen to display it, while current data to be displayed of the applications A and C is transmitted to the sub-screen display via the display channel 2 corresponding the sub-screen display to display it.

Figure 7:
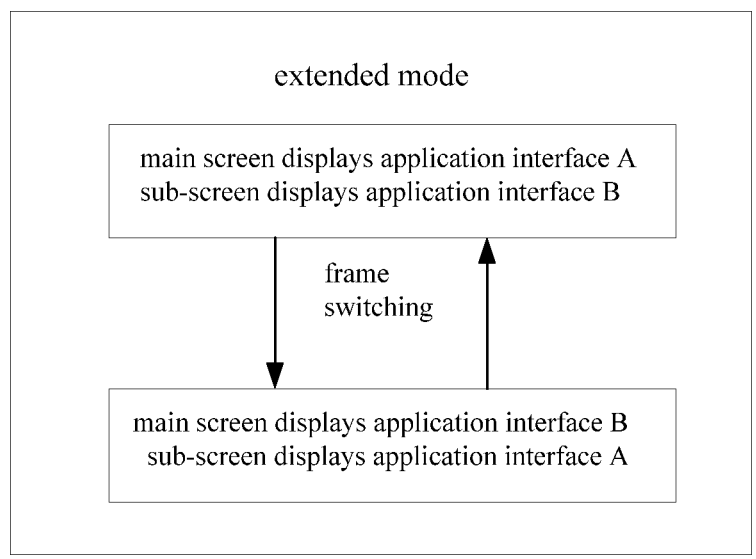
FIG. 7 is a schematic diagram of display state switching in an extended mode according to an embodiment of the disclosure.

Schematically, the second display mode is the extended mode, a state switching schematic diagram of which is shown in FIG. 7, a display unit corresponding to the second display mode includes a display screen 1 (which may be used as a main screen) and a display screen 2 (which may be used as a sub-screen), the first display state in the second display mode is that the main screen displays an application interface A and the sub-screen displays an application interface B, and the second display state is that the main screen displays the application interface B and the sub-screen displays the application interface A. When the second instruction for switching the first display state to the second display state is received, current data to be displayed of the application interface B is transmitted to the main screen display via the display channel 1 corresponding to the main screen to display it, while current data to be displayed of the application interface A is transmitted to the sub-screen via the display channel 2 corresponding the sub-screen to display it.

The method for switching display interface according to the embodiments of the disclosure can not only implementing switching between different display modes, but also switching between different display states in the same display mode, thereby providing a better user experience.

Figure 8:
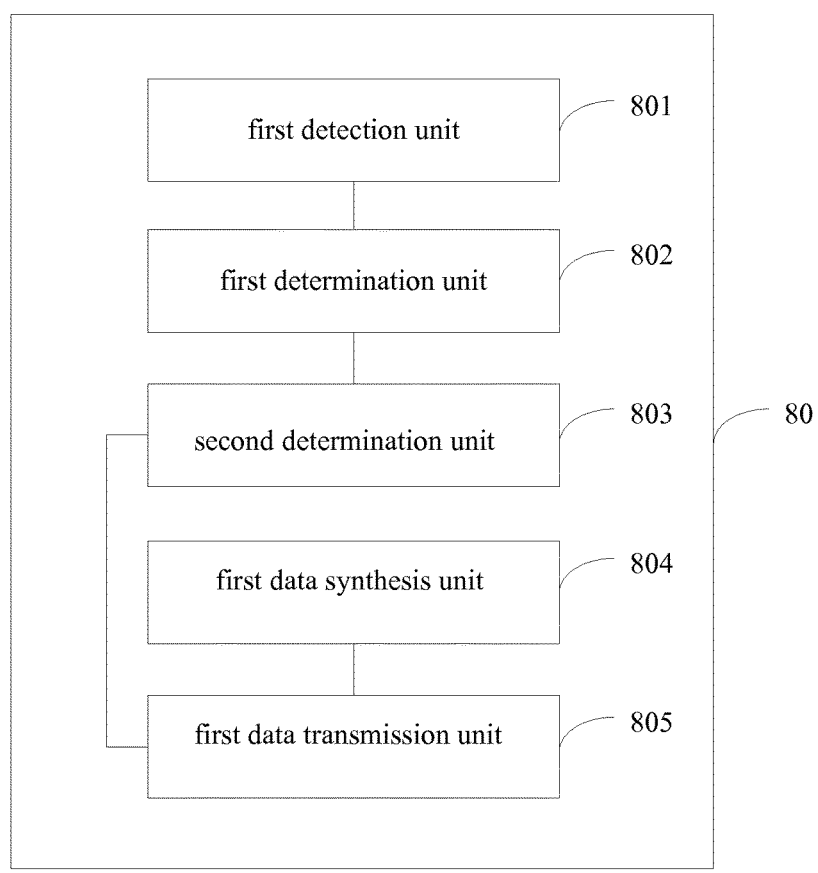
FIG. 8 is a schematic structural diagram of an electronic device 80 according to an embodiment of the disclosure.

Reference is made to FIG. 8 which is a schematic structural diagram of an electronic device 80 according to an embodiment of the disclosure. The electronic device 80 has a plurality of display units and includes at least a first display mode and a second display mode, where each display unit corresponds to one display channel, each display channel corresponds to at least one display unit, the electronic device 80 has pre-stored a corresponding relation between the display channel and the display unit. The electronic device 80 according to the embodiment of the disclosure may include a first detection unit 801, a first determination unit 802, a second determination unit 803, a first data synthesis unit 804 and a first data transmission unit 805.

The first detection unit 801 is configured to detect whether a first instruction is received and obtain a first detection result in the case that the electronic device 80 is in the first display mode.

Specifically, the first instruction is for switching a display mode of the electronic device 80 from the first display mode to the second display mode.

The first determination unit 802 is configured to stop synthesizing current data to be displayed in the first display mode and determine a second display unit corresponding to the second display mode if the first detection result obtained by the first detection unit 801 shows that the first instruction is received.

Specifically, the second display unit is one or more of the plurality of display units.

The second determination unit 803 is configured to determine a display channel corresponding to the second display unit which is determined by the first determination unit 802, based on the corresponding relation between the display channel and the display unit.

In one possible implementation, the electronic device 80 has pre-stored a corresponding relation between the display mode and the display unit, and the second determination unit 803 is configured to determine a display unit corresponding to the second display mode as the second display unit, based on the corresponding relation between the display mode and the display unit.

The first data synthesis unit 804 is configured to synthesize current data to be displayed in the second display mode.

The first data transmission unit 805 is configured to transmit the current data to be displayed in the second display mode, which is synthesized by the first data synthesis unit 804, to the second display unit corresponding to the second display mode via the display channel determined by the second determination unit 803, to display it.

In the prior art, the electronic device has one display channel, through which a plurality of display units display data, which causes the plurality of display units to display the same data, or causes the same data to be displayed on different display units, and thus switching between different display modes can not be implemented. Compared with the prior art, the electronic device according to the embodiment of the disclosure has a variety of display modes, where each display mode corresponds to at least one display unit, and each display unit corresponds to one display channel. Based on this, the electronic device according to the disclosure provides may determine a second display unit corresponding to the second display mode in the case that switching instruction for switching the first display mode to the second display mode is received, and then determine a display channel corresponding to the second display unit, and transmit the current data to be displayed in the second display mode to the second display unit via the determined display channel, to display it. The method for switching display mode and the electronic device according to the embodiment of the disclosure can implement switching between different display modes and take full value of a plurality of display units, and providing users with an innovative, lively and flexible application experience.

Figure 9:
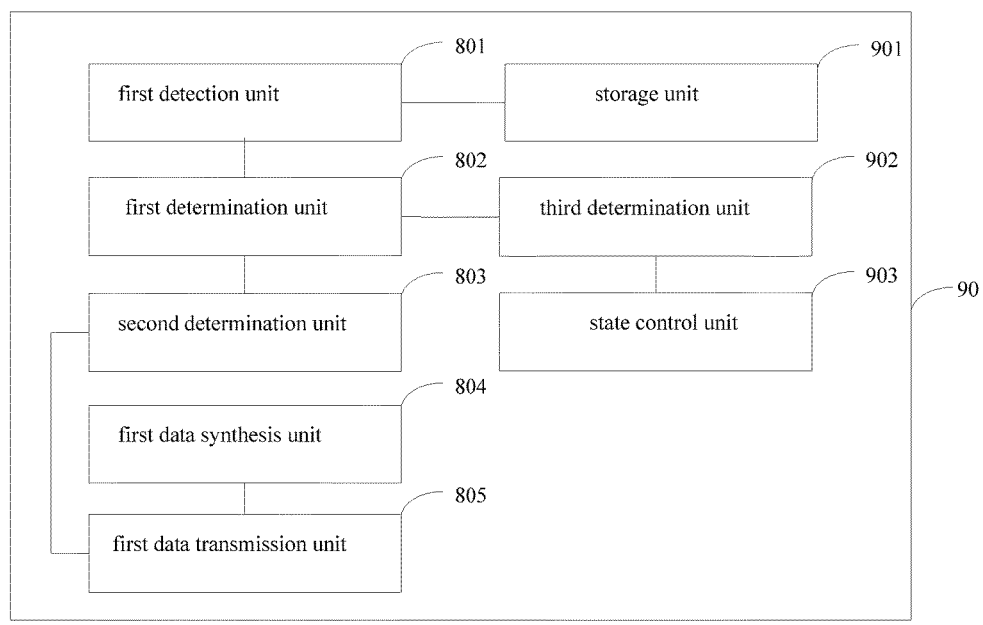
FIG. 9 is a schematic structural diagram of another electronic device 90 according to an embodiment of the disclosure.

Reference is made to FIG. 9 which is a schematic structural diagram of another electronic device 90 according to an embodiment of the disclosure. The electronic device 90 differs from the electronic device 80 according to the above-described embodiment in that it further includes a storage unit 901, and a third determination unit 902 and a state control unit 903, in addition to the first detection unit 801, the first determination unit 802, the second determination unit 803, the first data synthesis unit 804 and the first data transmission unit 805.

The storage unit 901 is configured to store current state information in the first display mode in the case that the display mode of the electronic device 90 is switched from the first display mode to the second display mode, to restore display state of the display unit corresponding to the first display mode in the case that the display mode of the electronic device 90 is switched back to the first display mode.

The third determination unit 902 is configured to determine whether a display unit different from the second display unit is present in display units corresponding to the first display mode.

The state control unit 903 is configured to allow the display unit different from the second display unit in the display units corresponding to the first display mode to be turned off or to sleep, if the third determination unit 902 determines that the display unit different from the second display unit is present in the display units corresponding to the first display mode.

In the prior art, the electronic device has one display channel, through which a plurality of display units display data, which causes the plurality of display units to display the same data, or causes the same data to be displayed on different display units, and thus switching between different display modes can not be implemented. Compared with the prior art, the electronic device according to the embodiment of the disclosure has a variety of display modes, where each display mode corresponds to at least one display unit, and each display unit corresponds to one display channel. Based on this, the electronic device according to the disclosure may determine a second display unit corresponding to the second display mode in the case that switching instruction for switching the first display mode to the second display mode is received, and then determine a display channel corresponding to the second display unit, and transmit the current data to be displayed in the second display mode to the second display unit via the determined display channel, to display it. The method for switching display mode and the electronic device according to the embodiment of the disclosure can implement switching between different display modes and take full value of a plurality of display units, providing users with an innovative, lively and flexible application experience. Further, with the method for switching display mode according to the embodiment of the disclosure, the display state of the display unit corresponding to the first display mode may be restored in the case that the display mode is switched back to the first display mode, and a display unit unrelated to the second display mode is allowed to be turned off or to sleep, reducing power consumption of the electronic device.

Figure 10:
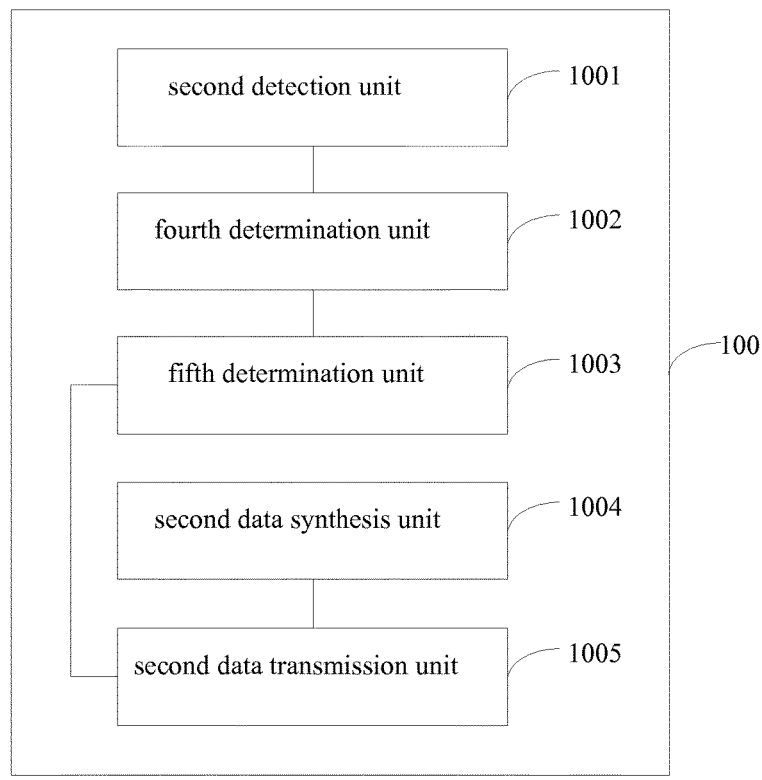
FIG. 10 is a schematic structural diagram of yet another electronic device 100 according to an embodiment of the disclosure.

An embodiment of the disclosure provides another electronic device, which includes a display state switching module configured to implementing switching between display states in the second display mode, in addition to the units in FIG. 8 or the units in FIG. 9. The second display mode includes at least a first display state and a second display state. Reference is made to FIG. 10 which is a schematic structural diagram of the display state switching module 100, which may include a second detection unit 1001, a fourth determination unit 1002, a fifth determination unit 1003, a second data synthesis unit 1004 and a second data transmission unit 1005.

The second detection unit 1001 is configured to detect whether a second instruction is received and obtain a second detection result in the case that the electronic device is in the first display state in the second display mode.

Specifically, the second instruction is for switching a display state in the second display mode from the first display state to the second display state.

The fourth determination unit 1002 is configured to determine a second display unit corresponding to the second display state as a target display unit if the second detection result obtained by the second detection unit 1001 shows that the second instruction is received.

The fifth determination unit 1003 is configured to determine a display channel corresponding to the target display unit which is determined by the fourth determination unit 1002, based on the corresponding relation between the display channel and the display unit.

The second data synthesis unit 1004 is configured to synthesize current data to be displayed corresponding to the target display unit which is determined by the fifth determination unit 1003.

The second data transmission unit 1005 is configured to transmit the current data to be displayed corresponding to the target display unit, which is synthesized by the second data synthesis unit 1004, to the target display unit via the display channel corresponding to the target display unit, to display it.

The electronic device according to the embodiments of the disclosure can not only implement switching between different display modes, but also implement switching between different display states in the same display mode, and thereby providing a better user experience.

The above electrical device may be a mobile terminal, there is a problem of complex operation process. The disclosure provides a method for controlling a mobile terminal, a device for controlling a mobile terminal and a mobile terminal. The implementation procedure may refer to the following embodiments.

First Embodiment

Figure 11:
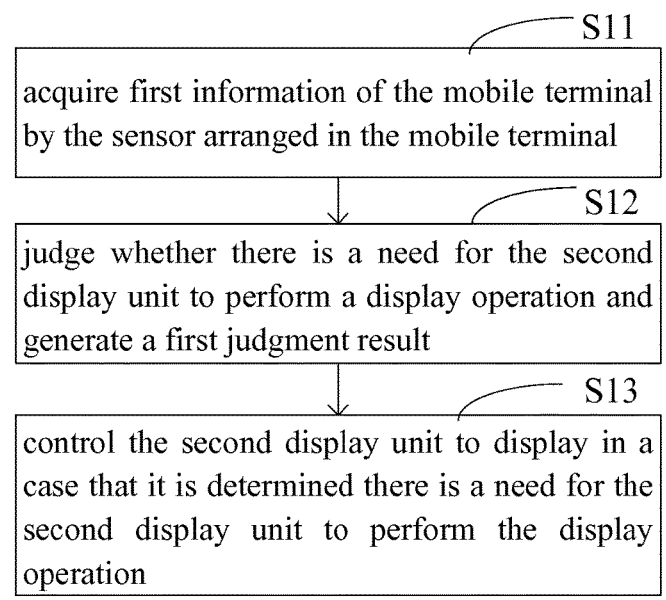
FIG. 11 is a schematic flow chart of applying the method for switching display mode in a mobile terminal as a method for controlling the mobile terminal according to an embodiment of the invention.

A method for controlling a mobile terminal is disclosed in the first embodiment of the invention. The mobile terminal includes a first display unit, a second display unit and a sensor. Referring to the schematic flow chart in FIG. 11, the method for controlling the mobile terminal includes steps as follows.

In step S11, first information of the mobile terminal is acquired by the sensor arranged in the mobile terminal.

In step S12, whether there is a need for the second display unit to perform a display operation is judged based on the first information of the mobile terminal, and a first judgment result is generated.

The first information of the mobile terminal can generally represent the current state of the mobile terminal, and whether there is a need for the second display unit to perform the display operation may be judged based on the state of the mobile terminal.

In step S13, the second display unit is controlled to display in a case that it is determined there is a need for the second display unit to perform the display operation based on the first judgment result.

In the method for controlling the mobile terminal described above, a method for making the mobile terminal perform the second screen displaying is disclosed. The mobile terminal includes a first display unit and a second display unit. The first display unit is generally used as the main screen of the mobile screen, such as a display screen of a cell phone. The second display unit is generally an optical generator arranged in the mobile terminal, such as a Pico Projector or a Digital Light Processing (DLP). The optical generator can generate a projecting beam which is projected onto a projection plane, and the second screen displaying of the mobile terminal may be implemented by the projection plane.

In steps S11 to S13, the method for controlling the mobile terminal acquires the first information of the mobile terminal firstly by the sensor arranged in the mobile terminal; and then judges whether there is a need for the second display unit to perform a display operation based on the first information; and controls the second display unit to display in a case that it is determined there is a need for the second display unit to perform the display operation.

With the method for controlling the mobile terminal, the first information of the mobile terminal is acquired by the sensor and in the case that it is determined there is a need for the second display unit to perform the display operation based on the first information, the mobile terminal controls the second display unit to display. Therefore, there is no need for the user to perform a control operation to the mobile terminal, and thereby the operation process of the second screen displaying is simplified.

Further, the method for controlling the mobile terminal disclosed by the application further includes:

switching an application mode of the first display unit of the mobile terminal in the case that it is determined there is a need for the second display unit to perform the display operation based on the first judgment result, to make the first display unit of the mobile terminal enter a standby state.

The above operation of switching the application mode of the first display unit may be performed between step S12 and step S13, or may also be performed at the same time as step S13 or after step S13, it is not limited herein.

The standby mode of the first display unit may be a silent mode, i.e., the mobile terminal keeps the notification tone turned off when receiving calls, short messages and third-party applications; in addition, the first display unit may also be in a power off condition to reduce energy consumption.

In step S12, a step of judging whether there is a need for the second display unit to perform a display operation based on the first information of the mobile terminal is disclosed.

Specifically, in a case that the sensor arranged in the mobile terminal is a gravity sensor and the first information is attitude information of the mobile terminal that is acquired by the gravity sensor, the judging whether there is a need for the second display unit to perform a display operation in the step includes:

judging whether a first plane of the mobile terminal is vertically downward based on the attitude information of the mobile terminal that is transmitted by the gravity sensor in a case that the first display unit is integrated in the first plane of the mobile terminal; and determining there is a need for the second display unit to perform a display operation if it is judged that the first plane is vertically downward, or determining there is no need for the second display unit to perform a display operation if it is judged that the first plane is not vertically downward.

If it is determined that the first plane is vertically downward based on the attitude information transmitted by the gravity sensor, it is indicated that the mobile terminal is currently in an overturning state. In this case, the second display unit may be used to perform the display operation.

For example, in the case that the user requires the optical generator of the mobile terminal to generate a projecting beam to perform the second screen displaying, the user may take the mobile terminal in hand and then overturn the mobile terminal; therefore, it may be determined there is a need for the second display unit to perform the display operation at present according to the above solution.

In addition, in a case that the sensor arranged in the mobile terminal includes a gravity sensor and a proximity sensor, and the first information includes attitude information of the mobile terminal that is acquired by the gravity sensor and distance information of the mobile terminal that is transmitted by the proximity sensor, the judging whether there is a need for the second display unit to perform a display operation in the step includes:

firstly, judging whether a first plane of the mobile terminal is vertically downward based on the attitude information of the mobile terminal that is transmitted by the gravity sensor in a case that the first display unit is integrated in the first plane of the mobile terminal; and secondly, judging whether the mobile terminal is placed on a plane based on the distance information of the mobile terminal that is transmitted by the proximity sensor in a case that it is determined the first plane is vertically downward based on the attitude information of the mobile terminal, and determining there is a need for the second display unit to perform a display operation if it is judged that the mobile terminal is placed on the plane, or determining there is no need for the second display unit to perform a display operation if it is judged that the mobile terminal is not placed on the plane.

In the above solution, if it is determined the first plane is vertically downward based on the attitude information transmitted by the gravity sensor, it is indicated that the mobile terminal is in an overturning state. In this case, further judgment requires to be performed based on the distance information transmitted by the proximity sensor. In the case that it is determined the mobile terminal is placed on a plane based on the distance information, the second display unit may be used to perform the display operation.

For example, in the case that the user requires the optical generator of the mobile terminal to generate a projecting beam to perform the second screen displaying, the mobile terminal may be overturned and then be placed on a desk; therefore it may be determined there is a need for the second display unit to perform the display operation at present according to the above solution.

With the above two methods for judging whether there is a need for the second display unit to perform the display operation, the condition for the mobile terminal to perform the second screen displaying may be flexibly configured, to adapt to different application scenarios.

Further, the disclosed method for controlling the mobile terminal further includes:

acquiring application information of the mobile terminal after the second display unit starts performing the display operation; and controlling the second display unit to display the application information.

The application information of the mobile terminal includes incoming information, and/or short message information, and/or other third party application information of the mobile terminal, for example, the received mails, QQ information and software update installation information.

Figure 12:
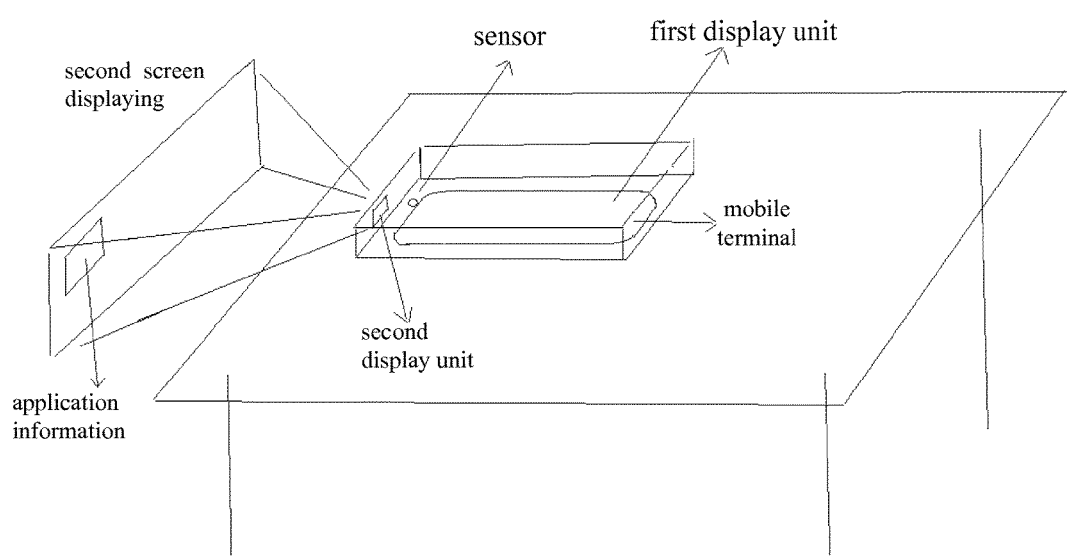
FIG. 12 is a schematic diagram showing a using state of a mobile terminal in the method for controlling the mobile terminal according to an embodiment of the invention.

Reference is made to FIG. 12 which is a schematic diagram showing a working condition of the mobile terminal, in the case that the mobile terminal performs the second screen displaying, the optical generator arranged in the mobile terminal generates a projecting beam which is projected onto a projection plane. In addition, a region is generated on the projection plane to display the application information, and thereby the user is prompted.

Second Embodiment

Figure 13:
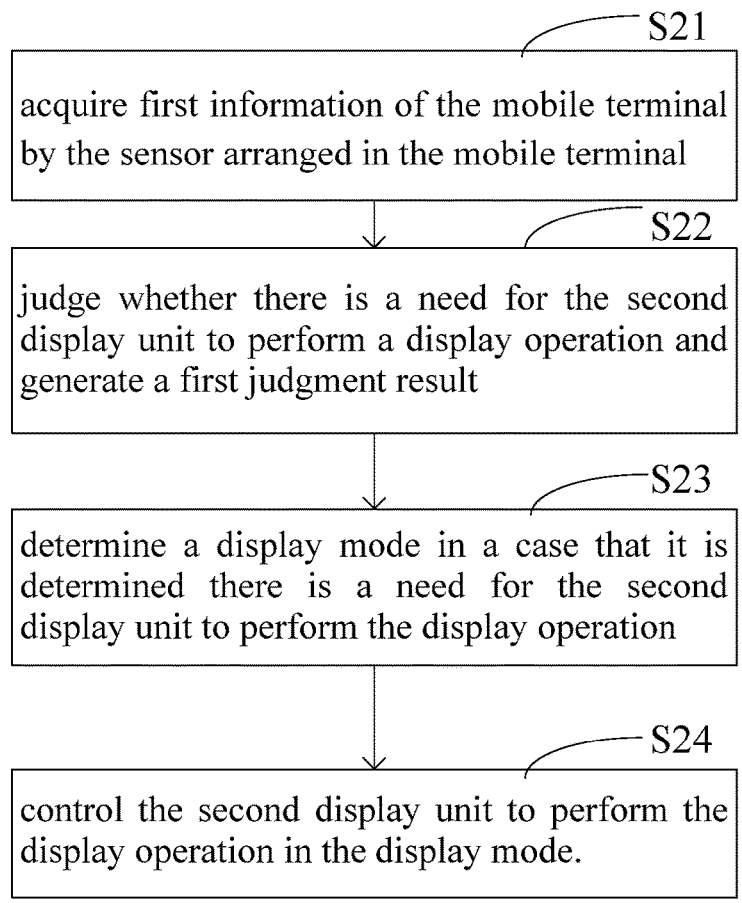
FIG. 13 is a schematic flow chart of another method for controlling a mobile terminal according to an embodiment of the invention.

A method for controlling a mobile terminal is disclosed in the second embodiment of the invention. The mobile terminal includes a first display unit, a second display unit and a sensor. Referring to the schematic flow chart in FIG. 13, the method for controlling the mobile terminal includes steps as follows.

In step S21, first information of the mobile terminal is acquired by the sensor arranged in the mobile terminal.

In step S12, whether there is a need for the second display unit to perform a display operation is judged based on the first information of the mobile terminal, and a first judgment result is generated.

The execution of steps S21 to S22 are the same as the execution of steps S11 to S12, one may refer to the other, and it is not repeated here.

In step S23, a display mode is determined in a case that it is determined there is a need for the second display unit to perform the display operation based on the first judgment result.

In step S24, based on the display mode, the second display unit is controlled to perform the display operation in the display mode.

In the above steps S23 to S24, a solution for controlling the second display unit to display in the case that it is determined there is a need for the second display unit to perform the display operation is disclosed. Specifically, in the case that it is determined there is a need for the second display unit to perform the display operation, a display mode requires to be determined. The display mode generally includes: a mode in which file information stored in the mobile terminal is displayed, i.e., file information stored in the mobile terminal is acquired and projected onto a projection plane; and a mode in which a display interface of the first display unit of the mobile terminal is displayed.

Further, after step S24, the method for controlling the mobile terminal further includes:

identifying a gesture operation for the second display unit by changes in light and shadow that occur when the second display unit displays, after the second display unit starts performing the display operation; and controlling the second display unit to perform an operation based on the identified gesture operation.

After the second display unit starts performing the display operation, the user needs to control the second display unit, and generally, this is achieved by the gesture operation.

As the user performs the gesture operation, changes in light and shadow are generated on the projection plane. The mobile terminal can identify the gesture operation based on the changes in light and shadow, to control the second display unit to perform an operation based on the gesture operation.

For example, in the case that the second display unit projects the file information stored in the mobile terminal onto the projection plane and there is a need to switch to a next page, the user makes a gesture operation. The mobile terminal acquires the corresponding changes in light and shadow, to identify the gesture operation based on the changes and then control the second display unit to display the content of the next page accordingly.

Figure 14:
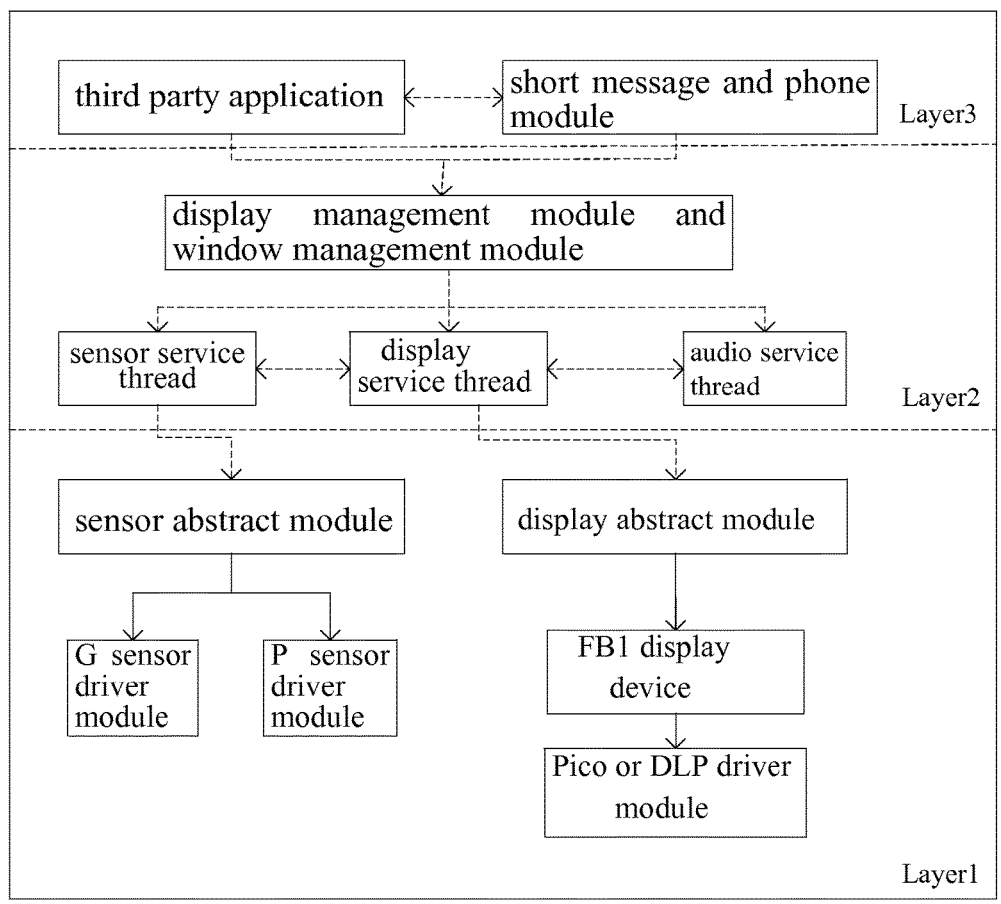
FIG. 14 is a software block diagram used in a method for controlling a mobile terminal according to an embodiment of the invention.

Further, referring to the software block diagram in FIG. 14, the software used in the method for controlling the mobile terminal according to the disclosure includes three software layers: Layer 1, a device driver layer; Layer 2, a system framework layer; and Layer 3, an application interface layer.

In the first layer, i.e., the device driver layer, a frame buffer, Framebuffer 1 (which is referred to FB1 for short), is provided as a device driver module for the optical generator such as Pico or DLP; in addition, a driver module for the gravity sensor (G sensor) is also provided, or a driver module for the gravity sensor (G sensor) and a driver module for the proximity sensor (P sensor) are provided, to allow the system of the mobile terminal to control the optical generator, the sensors and other hardware.

In the system framework layer, there is provided a service module, including a sensor service thread module, a display service thread module, an audio service thread module and other service thread modules. The sensor service thread module constantly acquires data of the P sensor and data of the G sensor that are transmitted from the first software layer; obtains an attitude of the mobile terminal based on the acquired data; reports an event that the mobile terminal is overturned or an event that the mobile terminal is overturned and placed on a plane, and at the same time, interacts with the display service thread module to start the second screen displaying and adapt a display direction of the second screen. The audio service thread module is responsible for processing of the silent mode.

The application interface layer is required to monitor an event that the mobile terminal is overturned or an event that the mobile terminal is overturned and placed on a plane, and switches the application mode of the mobile terminal to the standby mode based on the event. In general, call notifications, short message notifications and other third application notifications are required to be processed based on the event.

Third Embodiment

Figure 15:
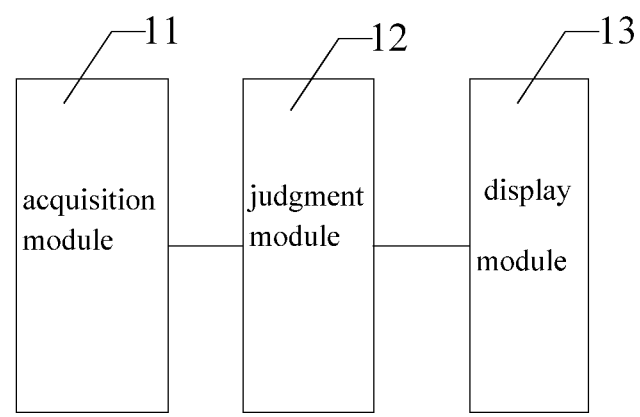
FIG. 15 is a schematic structural diagram of a device for controlling a mobile terminal according to an embodiment of the invention.

A device for controlling a mobile terminal is disclosed in the third embodiment of the application. The mobile terminal includes a first display unit, a second display unit and a sensor. Referring to the schematic structural diagram in FIG. 15, the device for controlling the mobile terminal includes an acquisition module 11, a judgment module 12 and a display module 13.

The acquisition module 11 is configured to acquire first information of the mobile terminal by the sensor.

The judgment module 12 is configured to judge whether there is a need for the second display unit to perform a display operation based on the first information of the mobile terminal, and generate a first judgment result.

The display module 13 is configured to control the second display unit to display in a case that it is determined there is a need for the second display unit to perform the display operation based on the first judgment result.

Furthermore, the device for controlling the mobile terminal further includes an application mode switching module configured to switch an application mode of the first display unit of the mobile terminal in the case that it is determined there is a need for the second display unit to perform the display operation based on the first judgment result, to make the first display unit of the mobile terminal enter a standby state.

Furthermore, in a case that the sensor is a gravity sensor and the first information is attitude information of the mobile terminal that is acquired by the gravity sensor, the judgment module includes: a first judgment unit configured to judge whether a first plane of the mobile terminal is vertically downward based on the attitude information of the mobile terminal that is transmitted by the gravity sensor in a case that the first display unit is integrated in the first plane, and determine there is a need for the second display unit to perform a display operation if it is judged that the first plane is vertically downward, or determine there is no need for the second display unit to perform a display operation if it is judged that the first plane is not vertically downward.

Furthermore, in a case that the sensor includes a gravity sensor and a proximity sensor, and the first information includes attitude information of the mobile terminal that is acquired by the gravity sensor and distance information of the mobile terminal that is transmitted by the proximity sensor, the judgment module includes a second judgment unit and a third judgment unit.

The second judgment unit is configured to judge whether a first plane of the mobile terminal is vertically downward based on the attitude information of the mobile terminal that is transmitted by the gravity sensor in a case that the first display unit is integrated in the first plane of the mobile terminal.

The third judgment unit is configured to: judge whether the mobile terminal is placed on a plane based on the distance information of the mobile terminal that is transmitted by the proximity sensor in a case that it is determined the first plane is vertically downward based on the attitude information of the mobile terminal; and determine there is a need for the second display unit to perform a display operation if it is judged that the mobile terminal is placed on the plane, or determine there is no need for the second display unit to perform a display operation if it is judged that the mobile terminal is not placed on the plane.

With the judgment module disclosed above, the mobile terminal can be flexibly configured to adapt to different application scenarios.

Furthermore, the device for controlling the mobile terminal further includes:

an application information acquisition module configured to acquire application information of the mobile terminal after the second display unit starts performing the display operation; and an application information display module configured to control the second display unit to display the application information.

With the application information acquisition module and the application information display module described above, the application information of the mobile terminal can be displayed on the second screen, to prompt the user.

Furthermore, the display module includes:

a display mode determination unit configured to determine a display mode in a case that it is determined there is a need for the second display unit to perform the display operation; and a display unit configured to control, based on the display mode, the second display unit to perform the display operation in the display mode.

The display mode generally includes: a mode in which file information stored in the mobile terminal is displayed, i.e., file information stored in the mobile terminal is acquired and projected onto a projection plane; and a mode in which a display interface of the first display unit of the mobile terminal is displayed.

Furthermore, the device for controlling the mobile terminal further includes:

a gesture identification module configured to identify a gesture operation for the second display unit by changes in light and shadow that occur when the second display unit displays, after the second display unit starts performing the display operation; and a control module configured to control the second display unit to perform an operation based on the identified gesture operation.

With the gesture identification module and the control module, the device for controlling the mobile terminal can identify a gesture operation made by the user, to control the second display unit to perform an operation.

With the device for controlling the mobile terminal, the first information of the mobile terminal is acquired by the sensor and in the case that it is determined there is a need for the second display unit to perform the display operation based on the first information, the mobile terminal controls the second display unit to display. Therefore, there is no need for the user to perform a control operation to the mobile terminal, and thereby the operation process of the second screen displaying is simplified.

Accordingly, a mobile terminal is disclosed by the disclosure. The mobile terminal includes a first display unit, a second display unit and a sensor, and the device for controlling the mobile terminal described above is integrated in a processor of the mobile terminal.

When being used by the user, the mobile terminal can judge whether there is a need for the second display unit to perform the display operation based on the mobile terminal's state. In the case that it is determined there is a need for the second display unit to perform the display operation, the operation of the second screen displaying is started without a control operation by the user, and thereby the operation process is simplified.

The embodiments of the disclosure are described herein in a progressive manner, with the emphasis of each embodiment is placed on the difference between it and the other embodiments; hence, for the same or similar parts between the embodiments, one can refer to the other embodiments. Since the device embodiments are substantially similar with the method embodiments, descriptions thereof are simple, and one can refer to the corresponding parts of the method embodiments for relevant parts.

Further, it should be noted that, relations terms such as "a first" and "a second" herein are only used to distinguish one entity or operation from another entity or operation, which do not necessarily require or indicate that any of such actual relation or sequence exists between these entities or operations. In addition, terms "comprise", "include" or any other variation thereof intends to be understood in a non-exclusive sense, so that a process, a method, an object or a device including a series of elements not only includes these elements, but also includes other elements not explicitly listed, or further includes elements inherent in the process, the method, the object or the device. In the absence of more restrictions, element defined by a sentence "includes a . . . " does not exclude that other same elements also exist in the process, the method, the object or the device including said element.

For convenience of description, the device described above is divided into various functional units to describe separately. Of course, the functions of the various units may be implemented in one or more of software and/or hardware in the process of implementing the disclosure. As can be seen from the above description of the embodiments, it can be clearly understood by those skilled in the art that the disclosure can be implemented in software in addition to necessary general purpose hardware platform. Based on such understanding, the technical solution of the disclosure essentially or the part contributing to the prior art may be embodied in a form of computer software product, the computer software product may be stored into a storage medium, such as a ROM/RAM, a magnetic disk or an optical disk, and include several instructions for causing a computer (which may be a personal computer, a server, or a network device) to perform the method described in each embodiment or some parts of the embodiments of the disclosure.

Those skilled in the art may recognize that the units and arithmetic steps of the examples that are described in connection with the embodiments disclosed herein can be implemented with electronic hardware or a combination of computer software and electronic hardware. Whether these functions are implemented in hardware or software depends on specific applications of the technical solution and design constraints. Professionals may use a different method for each specific application to implement the described functions, but this should not be considered as exceeding the scope of the disclosure.

Those skilled in the art may clearly understand that, for convenience and clarity of the description, the specific working processes of the system, device and units described above may refer to the corresponding processes in the former method embodiment, and which are not repeated here.

In the provided embodiments of the invention, it should be understood that the disclosed system, device and method may be implemented in other ways. For example, the embodiment of the device described above is just exemplary. For example, the division of the units is just based on the division in logical functions, and there may be additional division ways in practical implementations. For example, multiple units or components may be combined or may be integrated into another system, or some features may be omitted or not executed. In another aspect, the displayed or discussed coupling, or direct coupling or communication connection between each other may be indirect coupling or communication connection implemented by some interfaces, devices or units, and may be electrical, mechanical or in other forms.

The unit which is described as a separate component may be or may not be physically separated, and the component which is displayed as a unit may be or may not be a physical unit, that is, it may be located at one place or distributed onto multiple network units. A part or all of units may be selected based on actual requirements to implement the aim of the solutions in the embodiments.

In addition, various functional units in the embodiments of the invention may be integrated into one processing unit, or the various units may also be physically separated, or two or more of the units may also be integrated into one unit.

The above description of the disclosed embodiments makes the skilled in the art be capable of implementing or using the present disclosure. Various modifications on those embodiments will be apparent for the skilled in the art. The general principle defined herein may be implemented in other embodiments without departing from the spirit or scope of the present disclosure. Accordingly, the present disclosure will not be limited by those embodiments illustrated herein, but will conform to the widest scope which is in accordance with the principle and novelty features discloses herein.

The invention claimed is:

1. A method for switching display mode, wherein the method is applied to an electronic device having a plurality of display units and the electronic device comprises at least a first display mode and a second display mode, wherein each display unit corresponds to one display channel, each display channel corresponds to at least one display unit, the electronic device has pre-stored a corresponding relation between the display channel and the display unit, and the method comprises:
  detecting whether a first instruction is received and obtaining a first detection result, in the case that the electronic device is in the first display mode, wherein the first instruction is for switching a display mode of the electronic device from the first display mode to the second display mode;
  stopping synthesizing current data to be displayed in the first display mode and determining a second display unit corresponding to the second display mode if the first detection result shows that the first instruction is received, wherein the second display unit is one or more of the plurality of display units;
  storing information displayed currently by the display unit corresponding to the first display mode in response to receiving the first instruction, to restore display state of the display unit corresponding to the first display mode in the case that the display mode of the electronic device is switched back to the first display mode;
  determining a display channel corresponding to the second display unit, based on the corresponding relation between the display channel and the display unit; and
  synthesizing current data to be displayed in the second display mode, and transmitting the current data to be displayed in the second display mode to the second display unit corresponding to the second display mode via the determined display channel, to display it,
  wherein one of the first display mode and the second display mode is an independent mode, and another of the first display mode or the second display mode is an extended mode, wherein in the independent mode, data of a first application is transmitted to only a single one of display units corresponding to the independent mode and data of a second application different from the first application is transmitted to only another single one of the display units corresponding to the independent mode, wherein in the extended mode, different data of only a single one of the first application or the second application is transmitted respectively to different display units corresponding to the extended mode, wherein the independent mode comprises at least a first display state and a second display state, and wherein, in the first display state, data of a first application is transmitted to only a first one of display units corresponding to the independent mode and data of a second application different from the first application is transmitted to only a second one of the display units corresponding to the independent mode and in the second display state, the data of the first application is transmitted to only the second one of the display units corresponding to the independent mode, or in the first display state, data of the first application and a third application is transmitted to only the first one of display units corresponding to the independent mode and data of the second application is transmitted to only the second one of the display units corresponding to the independent mode, and in the second display state, the data of the first application and the second application is transmitted to only the second one of the display units corresponding to the independent mode and the data of the third application is transmitted to only the first one of display units corresponding to the independent mode.

2. The method according to claim 1, wherein the electronic device has pre-stored a corresponding relation between the display mode and the display unit; and the process of determining the second display unit corresponding to the second display mode comprises:
determining a display unit corresponding to the second display mode as the second display unit, based on the corresponding relation between the display mode and the display unit.

3. The method according to claim 1, further comprising:
determining whether a display unit different from the second display unit is present in display units corresponding to the first display mode; and
allowing the display unit different from the second display unit in the display units corresponding to the first display mode to be turned off or to sleep, if the display unit different from the second display unit is present in the display units corresponding to the first display mode.

4. The method according to claim 1, wherein the second display mode comprises at least the first display state and the second display state; and the method further comprises:
detecting whether a second instruction is received and obtaining a second detection result, in the case that the electronic device is in the first display state in the second display mode, wherein the second instruction is for switching a display state in the second display mode from the first display state to the second display state;
determining the second display unit corresponding to the second display state as a target display unit, if the second detection result shows that the second instruction is received;
determining a display channel corresponding to the target display unit, based on the corresponding relation between the display channel and the display unit; and
synthesizing current data to be displayed corresponding to the target display unit, and transmitting the current data to be displayed corresponding to the target display unit to the target display unit via the display channel corresponding to the target display unit, to display it.

5. A method according to claim 1, wherein the electrical device is a mobile terminal, the method is used to the mobile terminal as a method for controlling mobile terminal which is applied to the mobile terminal, the mobile terminal comprises a first display unit, a second display unit and a sensor, and the method further comprising:
acquiring first information of the mobile terminal by the sensor;
judging whether there is a need for the second display unit to perform a display operation based on the first information of the mobile terminal, and generating a first judgment result; and
controlling the second display unit to display in a case that it is determined there is a need for the second display unit to perform the display operation based on the first judgment result.

6. The method according to claim 5, further comprising:
switching an application mode of the first display unit of the mobile terminal in the case that it is determined there is a need for the second display unit to perform the display operation based on the first judgment result, to make the first display unit of the mobile terminal enter a standby state.

7. The method according to claim 5, wherein in a case that the sensor is a gravity sensor and the first information is attitude information of the mobile terminal that is acquired by the gravity sensor, the judging whether there is a need for the second display unit to perform a display operation comprises:
judging whether a first plane of the mobile terminal is vertically downward based on the attitude information of the mobile terminal that is transmitted by the gravity sensor in a case that the first display unit is integrated in the first plane, and determining there is a need for the second display unit to perform a display operation if it is judged that the first plane is vertically downward, or determining there is no need for the second display unit to perform a display operation if it is judged that the first plane is not vertically downward.

8. The method according to claim 5, wherein in a case that the sensor comprises a gravity sensor and a proximity sensor, and the first information comprises attitude information of the mobile terminal that is acquired by the gravity sensor and distance information of the mobile terminal that is transmitted by the proximity sensor, the judging whether there is a need for the second display unit to perform a display operation comprises:
judging whether a first plane of the mobile terminal is vertically downward based on the attitude information of the mobile terminal that is transmitted by the gravity sensor in a case that the first display unit is integrated in the first plane; and
judging whether the mobile terminal is placed on a plane based on the distance information of the mobile terminal that is transmitted by the proximity sensor in a case that it is determined the first plane is vertically downward based on the attitude information of the mobile terminal, and determining there is a need for the second display unit to perform a display operation if it is judged that the mobile terminal is placed on the plane, or determining there is no need for the second display unit to perform a display operation if it is judged that the mobile terminal is not placed on the plane.

9. The method according to claim 5, further comprising:
acquiring application information of the mobile terminal after the second display unit starts performing the display operation; and
controlling the second display unit to display the application information.

10. The method according to claim 5, wherein the controlling the second display unit to display in a case that it is determined there is a need for the second display unit to perform the display operation comprises:
determining a display mode in a case that it is determined there is a need for the second display unit to perform the display operation; and
controlling, based on the display mode, the second display unit to perform the display operation in the display mode.

11. The method according to claim 5, further comprising:
identifying a gesture operation for the second display unit by changes in light and shadow that occur when the second display unit displays, after the second display unit starts performing the display operation; and
controlling the second display unit to perform an operation based on the identified gesture operation.

12. An electronic device, wherein the electronic device has a plurality of display units and comprises at least a first display mode and a second display mode, wherein each display unit corresponds to one display channel, each display channel corresponds to at least one display unit, the electronic device has pre-stored a corresponding relation between the display channel and the display unit, and the electronic device comprises:
a first detection unit, configured to detect whether a first instruction is received and obtain a first detection result in the case that the electronic device is in the first display mode, wherein the first instruction is for switching a display mode of the electronic device from the first display mode to the second display mode;
a first determination unit, configured to stop synthesizing current data to be displayed in the first display mode and determine a second display unit corresponding to the second display mode if the first detection result obtained by the first detection unit shows that the first instruction is received, wherein the second display unit is one or more of the plurality of display units;
a storage unit, configured to store information displayed currently by the display unit corresponding to the first display mode in response to receiving the first instruction, to restore display state of the display unit corresponding to the first display mode in the case that the display mode of the electronic device is switched back to the first display mode;
a second determination unit, configured to determine a display channel corresponding to the second display unit which is determined by the first determination unit, based on the corresponding relation between the display channel and the display unit;
a first data synthesis unit, configured to synthesize current data to be displayed in the second display mode; and
a first data transmission unit, configured to transmit the current data to be displayed in the second display mode, which is synthesized by the first data synthesis unit, to the second display unit corresponding to the second display mode via the display channel determined by the second determination unit, to display it,
wherein one of the first display mode and the second display mode is an independent mode, and another of the first display mode or the second display mode is an extended mode,
wherein in the independent mode, data of a first application is transmitted to only a single one of display units corresponding to the independent mode and data of a second application different from the first application is transmitted to only another single one of the display units corresponding to the independent mode,
wherein in the extended mode, different data of only a single one of the first application or the second application is transmitted respectively to different display units corresponding to the extended mode,
wherein the independent mode comprises at least a first display state and a second display state, and
wherein, in the first display state, data of a first application is transmitted to only a first one of display units corresponding to the independent mode and data of a second application different from the first application is transmitted to only a second one of the display units corresponding to the independent mode and in the second display state, the data of the first application is transmitted to only the second one of the display units corresponding to the independent mode, or
in the first display state, data of the first application and a third application is transmitted to only the first one of display units corresponding to the independent mode and data of the second application is transmitted to only the second one of the display units corresponding to the independent mode, and in the second display state, the data of the first application and the second application is transmitted to only the second one of the display units corresponding to the independent mode and the data of the third application is transmitted to only the first one of display units corresponding to the independent mode.

13. The electronic device according to claim 12, wherein the electronic device has pre-stored a corresponding relation between the display mode and the display unit; and
the second determination unit is configured to determine a display unit corresponding to the second display mode as the second display unit, based on the corresponding relation between the display mode and the display unit.

14. The electronic device according to claim 12, further comprising:
a third determination unit, configured to determine whether a display unit different from the second display unit is present in display units corresponding to the first display mode; and
a state control unit, configured to allow the display unit different from the second display unit in the display units corresponding to the first display mode to be turned off or to sleep, if the third determination unit determines that the display unit different from the second display unit is present in the display units corresponding to the first display mode.

15. The electronic device according to claim 12, wherein the second display mode comprises the first display state and the second display state; and the electronic device further comprises:
a second detection unit, configured to detect whether a second instruction is received and obtain a second detection result in the case that the electronic device is in the first display state in the second display mode, wherein the second instruction is for switching a display state in the second display mode from the first display state to the second display state;

a fourth determination unit, configured to determine the second display unit corresponding to the second display state as a target display unit if the second detection result obtained by the second detection unit shows that the second instruction is received;

a fifth determination unit, configured to determine a display channel corresponding to the target display unit which is determined by the fourth determination unit, based on the corresponding relation between the display channel and the display unit;

a second data synthesis unit, configured to synthesize current data to be displayed corresponding to the target display unit which is determined by the fifth determination unit; and a second data transmission unit, configured to transmit the current data to be displayed corresponding to the target display unit, which is synthesized by the second data synthesis unit, to the target display unit via the display channel corresponding to the target display unit, to display it.

16. The electronic device according to claim 12, wherein the electronic device is a terminal device, having a device for controlling a mobile terminal, wherein the mobile terminal comprises a first display unit, a second display unit and a sensor, and the device for controlling the mobile terminal comprises:

an acquisition module configured to acquire first information of the mobile terminal by the sensor;

a judgment module configured to judge whether there is a need for the second display unit to perform a display operation based on the first information of the mobile terminal, and generate a first judgment result; and a display module configured to control the second display unit to display in a case that it is determined there is a need for the second display unit to perform the display operation based on the first judgment result.

17. The electronic device according to claim 16, wherein the device for controlling the mobile terminal further comprises:

an application mode switching module configured to switch an application mode of the first display unit of the mobile terminal in the case that it is determined there is a need for the second display unit to perform the display operation based on the first judgment result, to make the first display unit of the mobile terminal enter a standby state.

18. The electronic device according to claim 16, wherein in a case that the sensor is a gravity sensor and the first information is attitude information of the mobile terminal that is acquired by the gravity sensor, the judgment module comprises:

a first judgment unit configured to judge whether a first plane of the mobile terminal is vertically downward based on the attitude information of the mobile terminal that is transmitted by the gravity sensor in a case that the first display unit is integrated in the first plane, and determine there is a need for the second display unit to perform a display operation if it is judged that the first plane is vertically downward, or determine there is no need for the second display unit to perform a display operation if it is judged that the first plane is not vertically downward.

* * * * *